US008028342B2

(12) United States Patent
Delegue et al.

(10) Patent No.: US 8,028,342 B2
(45) Date of Patent: Sep. 27, 2011

(54) METHOD FOR INTERACTIVE REAL TIME SHARING OF MULTIMEDIA DATA, SERVER, AND INTERACTIVE REAL TIME COMMUNICATION NETWORK

(75) Inventors: Gérard Delegue, Cachan (FR);
Emmanuel Marilly,
Saint-Michel-sur-Orge (FR)

(73) Assignee: Alcatel Lucent, Paris (FR)

( * ) Notice: Subject to any disclaimer, the term of this patent is extended or adjusted under 35 U.S.C. 154(b) by 919 days.

(21) Appl. No.: 11/933,678

(22) Filed: Nov. 1, 2007

(65) Prior Publication Data

US 2008/0109878 A1 May 8, 2008

(30) Foreign Application Priority Data

Nov. 2, 2006 (FR) ...................................... 06 54687

(51) Int. Cl.
*G06F 21/24* (2006.01)
*G06F 15/16* (2006.01)
*G06F 11/30* (2006.01)
(52) U.S. Cl. ................... 726/28; 726/5; 705/52; 705/59
(58) Field of Classification Search ........................ None
See application file for complete search history.

(56) References Cited

U.S. PATENT DOCUMENTS

| 5,968,175 | A  | * | 10/1999 | Morishita et al. ............... 726/28 |
| 6,971,005 | B1 | * | 11/2005 | Henry et al. ................... 713/155 |
| 7,162,475 | B2 | * | 1/2007  | Ackerman ............................ 1/1 |
| 7,185,364 | B2 | * | 2/2007  | Knouse et al. .................... 726/8 |
| 7,194,764 | B2 | * | 3/2007  | Martherus et al. ................ 726/8 |
| 7,290,057 | B2 | * | 10/2007 | Saunders et al. ............... 709/231 |
| 7,647,642 | B2 | * | 1/2010  | Erickson .......................... 726/27 |
| 7,788,709 | B1 | * | 8/2010  | Henry et al. ....................... 726/6 |
| 2002/0059120 | A1 | * | 5/2002  | Milton ............................. 705/28 |
| 2004/0254934 | A1 |   | 12/2004 | Ho et al. |
| 2005/0066219 | A1 |   | 3/2005  | Hoffman et al. |
| 2005/0125285 | A1 | * | 6/2005  | McQueeney et al. ........... 705/14 |
| 2005/0125358 | A1 | * | 6/2005  | Levin et al. ..................... 705/59 |
| 2006/0116966 | A1 | * | 6/2006  | Pedersen et al. ................ 705/59 |
| 2006/0167813 | A1 | * | 7/2006  | Aydar et al. ..................... 705/59 |
| 2007/0036287 | A1 | * | 2/2007  | Campbell .................... 379/67.1 |
| 2007/0261116 | A1 | * | 11/2007 | Prafullchandra et al. ....... 726/22 |
| 2007/0271592 | A1 | * | 11/2007 | Noda et al. ........................ 726/1 |
| 2008/0046988 | A1 | * | 2/2008  | Baharis et al. .................... 726/7 |
| 2008/0109910 | A1 | * | 5/2008  | Day et al. ........................ 726/27 |
| 2008/0201771 | A1 | * | 8/2008  | Ueda ................................. 726/7 |
| 2009/0132689 | A1 | * | 5/2009  | Zaltzman et al. ............. 709/223 |
| 2010/0154034 | A1 | * | 6/2010  | Tsukada et al. ................... 726/4 |
| 2010/0269146 | A1 | * | 10/2010 | Britt ............................... 725/110 |

FOREIGN PATENT DOCUMENTS

EP           1376309 A2      2/2004

* cited by examiner

*Primary Examiner* — Christopher Revak
(74) *Attorney, Agent, or Firm* — Fay Sharpe LLP

(57) ABSTRACT

A method of sharing multimedia data, comprising:
a step of inserting multimedia data into a space administered by an author;
a step of the author establishing a list of approved persons receiving a right of access to the multimedia data contained in the space administered by the author, those persons forming a virtual community;
a step of authenticating a visitor requesting access to the space administered by the author;
a step of informing the author of the identity of the authenticated visitor;
a step of the author automatically launching an interactive real time communication session with the authenticated user.

19 Claims, 1 Drawing Sheet

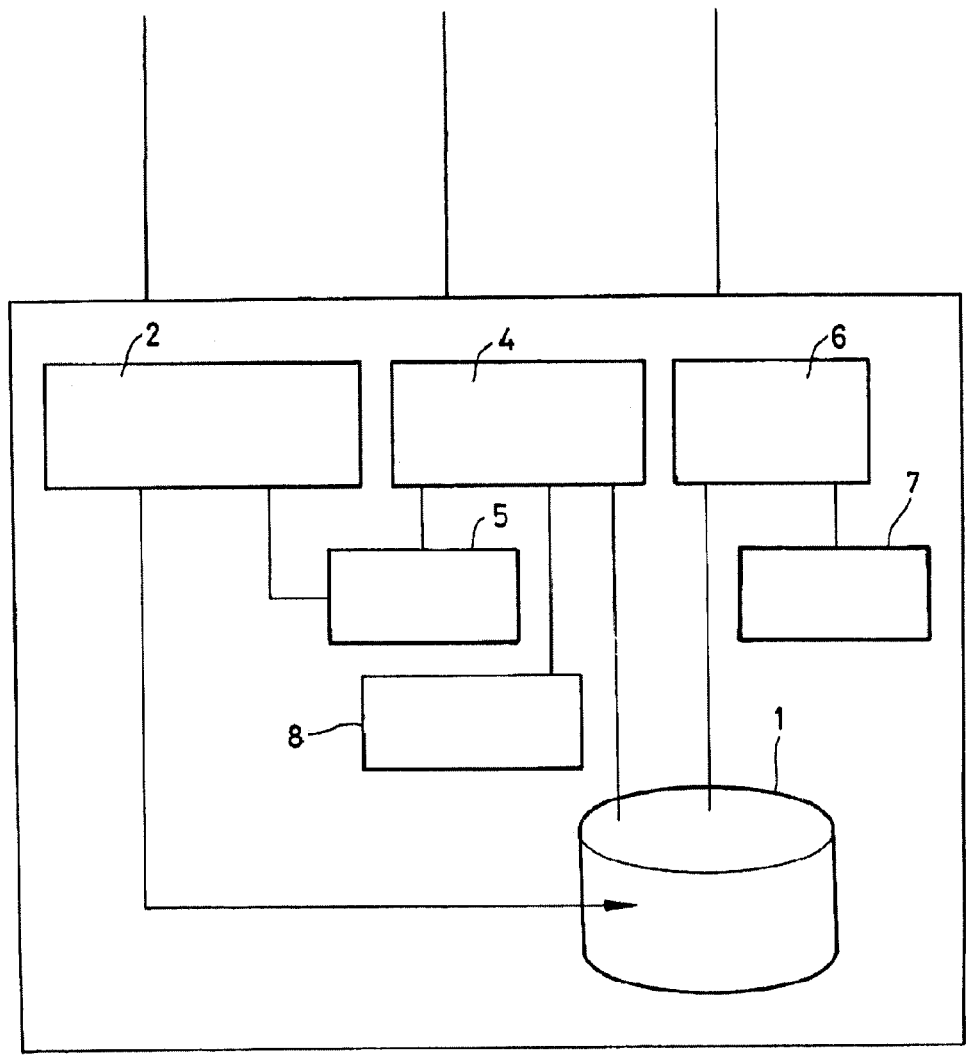

METHOD FOR INTERACTIVE REAL TIME SHARING OF MULTIMEDIA DATA, SERVER, AND INTERACTIVE REAL TIME COMMUNICATION NETWORK

CROSS-REFERENCE TO RELATED APPLICATIONS

This application is based on French Patent Application No. FR 0654687 filed Feb. 11, 2006, the disclosure of which is hereby incorporated by reference thereto in its entirety, and the priority of which is hereby claimed under 35 U.S.C. §119.

BACKGROUND OF THE INVENTION

1. Field of the Invention

The technical field of the invention is multimedia.

2. Description of the Prior Art

At present, with the use of devices including digital cameras, people are producing more and more multimedia data. They wish to be able to share this data with other persons (family, friends, sport team, working group) and comment on their data in real time.

A large number of web sites enable the sharing of multimedia contents. However, the consultation of multimedia documents thereon is not interactive.

Blogs, a catch-all term derived from the contraction of web and log, also enable the sharing of multimedia contents. Blogs are Internet sites for free and occasional self-expression in the form of texts, hypertext links and/or images published as and when contributors see fit and in reverse chronological order, often by a single author and on a personal basis. Personal blogs enable a person to display his ideas, his moods day by day, and visitors can post their reactions to the content of the blog. Blogs are very successful, to the point that several search engines are dedicated to them (for example Technorait, Feedster, Sphere). It is estimated that the number of blogs doubles every six months and that several tens of millions of them exist. The most widespread use of the blog is the on-line diary or the travel journal. Some persons create blogs to share their passions or to publish amateur or professional photographs. There are also opinion blogs maintained by professional journalists or politicians, as well as corporate blogs. Blogs can be updated from mobile terminals. A blog generally contains the following elements:

messages (posts) in reverse chronological order;
the archives of the blog, which can be consulted by date;
the list of external links (blogroll), this list showing the mutual recognition by the authors of their belonging to the same virtual community;
the RSS (Rich Site Summary, Really Simple Syndication) feed supplying a description, structured by tags, of the various elements of a blog: titles of posts, content, date, author, links.

Blogs have a number of drawbacks. They can in theory be consulted by anyone browsing the Internet and generally do not provide for the creation of closed or conditional access virtual communities. The blogger can assume a false name and pseudonyms are frequently used. The blogger is not visible and in a face-to-face relationship with his public. What is more, the vast majority of blogs do not enable real time interaction. Moreover, the multimedia documents in them are not properly protected against illegal copying.

The Windows Live Spaces platform from Microsoft links the old functions of the old MSM Spaces platform to the MSN Messenger instant messaging software, a Friends Explorer module enabling users to invite their friends and to contact the friends of their contacts. Windows Live Spaces enables the creation of personal spaces and personal communities with conditional access: the default parameter settings limit to the Windows Live Messenger list of friends the right to access the space of the author of the web pages, who can thus specify who can contact him, who can consult his profile and who can view the content of his space.

There are also known Internet videoconference systems (for example WebeX Meeting Center, Microsoft Live Meeting, Citrix GoTo Meeting, Groove Virtual Office, eZmeeting), these systems having many applications, for example tele-engineering, distance learning (e-learning), work meetings. The videoconference is an audiovisual teleconference service providing real time bidirectional transfer of voice and animated color images as well as computer data between groups of users located in at least two different places, in point-to-point mode or multipoint mode. VRVS (Virtual Room Videoconferencing System), for example, enables reservation of virtual conference rooms on Mbone or in the H323 protocol. An H323 terminal is equipped with software such as Netmeeting from Microsoft or Ekiga, for example.

Videoconference systems have drawbacks. In particular, multimedia documents cannot be viewed outside a session, the session having to be open before the publication of multimedia documents.

The applicant has developed two applications for interactive television over IP: AmigoTV and MyOwnTV.

The interactive television technology called AmigoTV enables the user to share opinions and emotions within a community. If a number of friends are watching the same television program, using AmigoTV, they can comment live, their voices passing over the Internet, six persons being able to communicate at the same time. To discover who is connected to his television and the channel he is watching, it suffices to use the remote control to consult a menu where all this information is shown in real time, the presence of the members of the community being indicated by overlaid avatars. AmigoTV also enables sending of images and sounds chosen from a catalog, to illustrate one's mood in response to a televised event.

MyOwnTV is another triple play offer centered on the user, enabling users to share multimedia contents (photographs, videos) within a restricted circle, an integrated videophone service providing, in the future, for dialog within the virtual community. The multimedia contents are viewed by the members of the community using a television/decoder combination. With this solution, there is no real time interaction and the mobile environment is not taken into account. Data is protected by authentication and there are no means for controlling the use of the documents and in particular copying thereof.

The document U.S. Pat. No. 6,301,607 describes a device and a method for displaying and sharing images via the Internet. Digital images (photos or videos) are sent to a server, an electronic mail being sent automatically to a list of persons selected by the sender of the images, this automatic mail informing those persons of new images deposited on the server. Information such as IP address, telephone number, description of the images can be attached to the images sent to the server. If a person clicks on an image, they initiate an IP telephone conversation with the author.

The invention aims to propose a service enabling sharing of multimedia contents within a community, this service not having the drawbacks of the existing services.

SUMMARY OF THE INVENTION

To this end, a first aspect of the invention consists in a method of sharing multimedia data, comprising:

a step of inserting multimedia data into a space administered by an author;

a step of the author establishing a list of approved persons receiving a right of access to the multimedia data contained in the space administered by the author, those persons forming a virtual community;

a step of authenticating a visitor requesting access to the space administered by the author;

a step of informing the author of the identity of the authenticated visitor;

a step of the author automatically launching an interactive real time communication session with the authenticated user.

The term "interactive" here refers to the possibility of a two-way communication between the author and the visitor. Thus, for example, the visitor and the author may communicate their feelings to each other when looking at a multimedia document such as a holiday video.

The term "real time" here refers to the fact that data exchanged between the author and the visitor is processed at a speed such that the author and the visitor cannot discern the processing time, which gives them the feeling of sharing the same experience. This is not necessarily "real time" in its strictest sense, where failure to comply with a time constraint leads to abnormal functioning. It advantageously involves a flexible real time which ensures optimum quality of service up to a predetermined response time, and then a degraded quality of service beyond that response time.

The method advantageously includes a step of sending a list of addressees a message informing them of insertion of multimedia data into the space administered by the author. This list of addressees can include persons who are not yet part of the author's virtual community. They could be friends of a member of the community, for example.

The method advantageously includes a step of defining conditional access and digital rights management (DRM) rules for each multimedia data item. Thus the author can enable or not copying or modification of his multimedia data for such or such a visitor to his space, or set a time for which data can be viewed, for example.

The method advantageously includes, before the launching of the communication session, a step of browsing the multimedia data of the author by the authenticated visitor and a step of displaying on a terminal of the author the paths taken by the authenticated visitor when browsing. Thus before setting up the call the author will have an idea of the interests of the visitor.

The method advantageously includes a step of the visitor terminal communicating the identity of the visitor associated with that terminal if that terminal is not recognized as belonging to one of the members of the virtual community.

A second aspect of the invention consists in a server for implementing the above method, including a database containing multimedia data of the author and associated metadata. The metadata advantageously includes information relating to conditional access to the multimedia data and to digital rights management (DRM).

A presence server advantageously indicates what address should preferably be used for the author and sends a notification of that address to the author containing the identity of the authenticated visitor. Thus the author can be advised of any visit to his virtual space whether he is traveling (the message reaches him on his mobile communication terminal) or at home (the message reaches him on his television or his desktop computer, for example).

The server advantageously includes a data adaptation function for presenting the multimedia contents as a function of the capacities of the terminal of the visitor and the network. The data adaptation function adapts the format according to predefined document models for example. In one advantageous embodiment the video data is coded using a codec supported by the terminal and the resolution of the images is adapted to the characteristics of the terminal in order to reduce the network bandwidth used.

A third aspect of the invention consists in a network including the above server, a terminal associated with the author and at least one terminal associated with a visitor (telephone, PDA, computer, decoder, etc.) and a gateway for receiving requests to view multimedia contents of the database from the terminal associated with the visitor.

The terminals advantageously integrate a multimedia data browsing function.

The terminals advantageously integrate the digital rights management (DRM) rules.

BRIEF DESCRIPTION OF THE DRAWINGS

Other objects and advantages of the invention will become apparent in the light of the description given hereinafter with reference to the appended drawing in which the single FIGURE shows the main functions of one embodiment of a service according to the invention.

DETAILED DESCRIPTION OF THE PREFERRED EMBODIMENT

As can be seen in FIG. 1, the multimedia data sharing service comprises a database 1 containing the multimedia data and associated metadata.

Here "multimedia data" refers in particular to personal digital data of an author (physical person, association, enterprise). This multimedia data can consist of photos or videos, for example. Here "author" refers to the creator of the data or any person with the right of access to multimedia data of a creator.

Here "metadata" refers to a set of information associated with the digital data.

The metadata advantageously includes the addresses of the authors of data: for example email, telephone numbers, IP addresses.

The metadata advantageously includes a description of the images: for example geographical information, date of shooting, tourist information. The presence of this metadata facilitates browsing in the database 1.

The metadata advantageously comprises information relating to conditional access to the multimedia data, on the one hand, and digital rights management (DRM) rules, on the other hand. For example, the author can specify what community is entitled to view the data and where appropriate copy it one or more times, or even modify it.

A downloading function 2 enables opening of a session with remote devices 3 (desktop computers 3a, mobile telephones 3b, decoder 3c, personal digital assistants (PDA)).

At the start of a session, the remote device 3 is authenticated. For unknown remote devices, a function requests the identity of the end user with his various addresses (for example telephone number, skype login, email address).

A gateway 4 receives the requests to view the multimedia contents of the base 1 from the terminals 3. A function for browsing the multimedia data is integrated into the terminals 3. The end user can therefore select the name of a community and the optional criteria for filtering the required multimedia documents: for example by date.

The gateway 4 is responsible for verifying the authenticity of the terminal 3 and the authorizations associated with that terminal in relation to a management function 5 for managing conditional access, on the one hand, and digital rights management (DRM), on the other hand. This function 5 verifies that a visitor is authorized to browse the multimedia contents for a given community. This management function 5 is advantageously responsible for controlling use of the documents for effective protection of authors' rights and copyrights. For example, a document author can specify whether the document can be copied or not. An author can also specify the period for which the document can be viewed and the community that can view the document.

The gateway 4 is responsible for notifying or setting up a call with the author of the multimedia content, with the automatic call set-up function 6. This function 6 automatically sets up a communication session between a person consulting the multimedia content and the author of that content. This function 6 retrieves the author's various addresses (email, telephone numbers, IP addresses). It then asks a presence server 7 which address to use for preference and sends a notification to the author with the name of the visitor. The notification can be displayed on the PC, the mobile telephone or the television.

The gateway 4 is responsible for calling the data adaptation function 8, which presents the multimedia contents as a function of various criteria such as: capacities of the terminal and the network, volume of data, wishes of the end user. The characteristics of the images and video can be modified (image resolution, number of colors, formats supported). The data adaptation function 8 adapts the format according to predefined document models. Examples of models for photos are:

- a screen with a table containing small photos (thumbnails) to provide an overview of the photos;
- a screen with a large image and buttons for downloading the previous or next image (filmstrip).

For the authors of the published documents, a data presentation function creates small icons for showing the documents examined by the visitors and their identity. These icons give real time information on the documents visited and provide an easy way to comment on them and to interact with visitors.

The call set-up request can be triggered by the author or the visitor with one click. If the called party accepts the call, the session is opened.

During the session, the author can see which content the visitors are browsing: icons generated by the data presentation function and corresponding to the content consulted are sent to the author. The digital rights characteristics are integrated into the terminals for reliable delivery. For the author of documents, this function indicates in fine detail what is seen on the screen by the end users: this function notifies the server of the photograph that is currently zoomed in on, for example. It also notifies the video information (name of the video clip, start of the film, time since the start of the film, pause control), for example. When a call is set up with the author of the document, this information is transferred to the author. With this information, interaction between the author of the document and the visitor are more user friendly. As a result emotions and opinions can be shared in real time.

The invention provides easy access to multimedia contents from various terminals. In particular, the gateway enables browsing of multimedia documents created by a community from various terminals (mobile terminals, desktop computer, television). The documents can be adapted to the capacities of the terminal or the network.

The invention enables a call to be set up between the author of the multimedia document and the visitor with one click.

The invention enables protection of the multimedia contents with advanced digital rights management functions.

For the service provider, the invention enables attractive new services to be offered. Several business models can be proposed: the author and the visitor can pay a charge for the service. Advertisements can be added to the multimedia documents. The service can also generate supplementary traffic.

There is claimed:

1. A method of sharing multimedia data, comprising:
    a step of inserting multimedia data into a virtual space administered by an author;
    a step of the author establishing a list of approved persons receiving a right of access to the multimedia data contained in the space administered by the author, those persons forming a virtual community;
    a step of authenticating a visitor requesting access to the virtual space administered by the author;
    a step of informing the author of the identity of the authenticated visitor; and
    a step of automatically launching an interactive real time communication session with the author and the authenticated visitor.

2. The method as claimed in claim 1 including a step of sending a list of addressees a message informing them of insertion of multimedia data into the space administered by the author.

3. The method as claimed in claim 1 including a step of defining conditional access and digital rights management (DRM) rules for each multimedia data item.

4. The method as claimed in claim 1, including:
    before the launching of the communication session, a step of browsing the multimedia data of the author by the authenticated visitor; and
    a step of displaying on a terminal of the author during the communication session the paths taken by the authenticated visitor when browsing.

5. The method as claimed in claim 1, including a step of the visitor terminal communicating the identity of the visitor associated with that terminal if that terminal is not recognized as belonging to one of the members of the virtual community.

6. The method as claimed in claim 1 wherein the step of launching the interactive real time communication session includes informing the author of the identity of the authenticated visitor.

7. The method as claimed in claim 1 further comprising:
    generating icons showing in real time the content examined by the authenticated and giving the authenticated visitor's identity; and
    sending the icons to the author during the interactive real time communication session showing the author which content the authenticated visitor is browsing.

8. A server for sharing multimedia data comprising:
    a database containing multimedia data of an author and associated metadata, the database containing a list of approved persons receiving a right of access to the multimedia data, those persons forming a virtual community;
    means for authenticating a visitor requesting access to the multimedia data;
    means for informing the author of the identity of the authenticated visitor; and
    means for automatically launching an interactive real time communication session with the author and the authenticated visitor.

9. The server as claimed in claim 8, wherein the metadata includes information relating to conditional access to the multimedia data and to digital rights management (DRM).

10. The server as claimed in claim 8, further comprising a presence server indicating what address should preferably be used for the author, the presence server sending a notification to the author at the address containing the identity of the authenticated visitor.

11. The server as claimed in claim 8, including a data adaptation function for presenting the multimedia contents as a function of the capacities of the terminal of the visitor and the network.

12. The server as claimed in claim 11, wherein the data adaptation function adapts the format as claimed in predefined document models.

13. The server as claimed in claim 8 wherein the means for automatically launching the interactive real time communication session with the author and the authenticated visitor is the means for informing the author of the identity of the authenticated visitor.

14. The server as claimed in claim 8, further comprising:
   means for generating icons showing in real time the content examined by the authenticated and giving the authenticated visitor's identity; and
   means for sending the icons to the author during the interactive real time communication session showing the author which content the authenticated visitor is browsing.

15. A network comprising:
   a terminal associated with an author;
   a terminal associated with a visitor;
   a gateway receiving a request from the terminal associated with the visitor to view multimedia belonging to the author; and
   a server including a database containing the multimedia and associated metadata, the database containing a list of approved persons receiving a right of access to the multimedia those persons forming a virtual community, means for authenticating the terminal associated with the visitor requesting access to the multimedia, means for informing the author of the identity of the authenticated visitor, and means for automatically launching an interactive real time communication session with the author and the authenticated visitor.

16. The network as claimed in claim 15, wherein the terminals integrate a multimedia data browsing function.

17. The network as claimed in claim 15, wherein the terminals integrate the digital rights management (DRM) rules.

18. The network as claimed in claim 15, wherein the means for automatically launching the interactive real time communication session with the author and the authenticated user is the means for informing the author of the identity of the authenticated visitor.

19. The network as claimed in claim 15, wherein the server further comprises:
   means for generating icons showing in real time the content examined by the authenticated visitor and giving the authenticated visitor's identity; and
   means for sending the icons to the author during the interactive real time communication session showing the author which content the authenticated visitor is browsing.

* * * * *